(12) United States Patent
Dai et al.

(10) Patent No.: US 8,376,638 B2
(45) Date of Patent: Feb. 19, 2013

(54) KEYBOARD WITH ROTATION DETECTION MODULE AND PIVOTABLE SUPPORTING MEMBER

(75) Inventors: Lung Dai, Taipei Hsien (TW); Wang-Chang Duan, Shenzhen (CN); Bang-Sheng Zuo, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 609 days.

(21) Appl. No.: 12/610,373

(22) Filed: Nov. 2, 2009

(65) Prior Publication Data

US 2010/0165559 A1 Jul. 1, 2010

(30) Foreign Application Priority Data

Dec. 27, 2008 (CN) .......................... 2008 1 0306583

(51) Int. Cl.
*G06F 3/02* (2006.01)
*A63F 13/08* (2006.01)

(52) U.S. Cl. ......................................... 400/472; 463/37
(58) Field of Classification Search ................... 463/36, 463/37, 38, 39; 400/472
See application file for complete search history.

(56) References Cited

U.S. PATENT DOCUMENTS

| | | | |
|---|---|---|---|
| 6,409,127 B1 * | 6/2002 | VanderHeide et al. | 248/118 |
| 6,427,959 B1 * | 8/2002 | Kalis et al. | 248/288.11 |
| 7,270,602 B2 | 9/2007 | Uehara et al. | |
| 7,488,254 B2 * | 2/2009 | Himoto et al. | 463/37 |
| 2005/0243783 A1 * | 11/2005 | Lee et al. | 370/338 |
| 2006/0109251 A1 * | 5/2006 | Kelly | 345/168 |
| 2007/0022582 A1 * | 2/2007 | Carnevali | 24/523 |
| 2007/0176896 A1 * | 8/2007 | Gritton et al. | 345/157 |

* cited by examiner

*Primary Examiner* — Daniel J Colilla
(74) *Attorney, Agent, or Firm* — Altis Law Group, Inc.

(57) ABSTRACT

A keyboard includes a main body, a rotation detecting module, and a swivel hinge. The main body is disposed with a plurality of keys. The rotation detecting module is used for detecting the rotation of the main body. The swivel hinge is detachably connected to the main body. The swivel hinge includes an extending arm being rotatable with respect to the main body; and a supporting member pivotally engaging with the extending arm for supporting the main body.

17 Claims, 5 Drawing Sheets

KEYBOARD WITH ROTATION DETECTION MODULE AND PIVOTABLE SUPPORTING MEMBER

BACKGROUND

1. Technical Field

The disclosed embodiments relate to keyboards, and more particularly to a keyboard with extended features.

2. Description of Related Art

Keyboards are widely used as input devices for computers and other electronic devices. The keyboards in use are usually supported on a surface. When a typical keyboard is adopted as an input device for computer games, such as car racing games, the keyboard can only provide linear inputs for steering. Thus, the typical keyboard is not an ideal device for playing car racing games.

Therefore, it is desired to provide a keyboard to overcome the above-described shortcomings and deficiencies.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
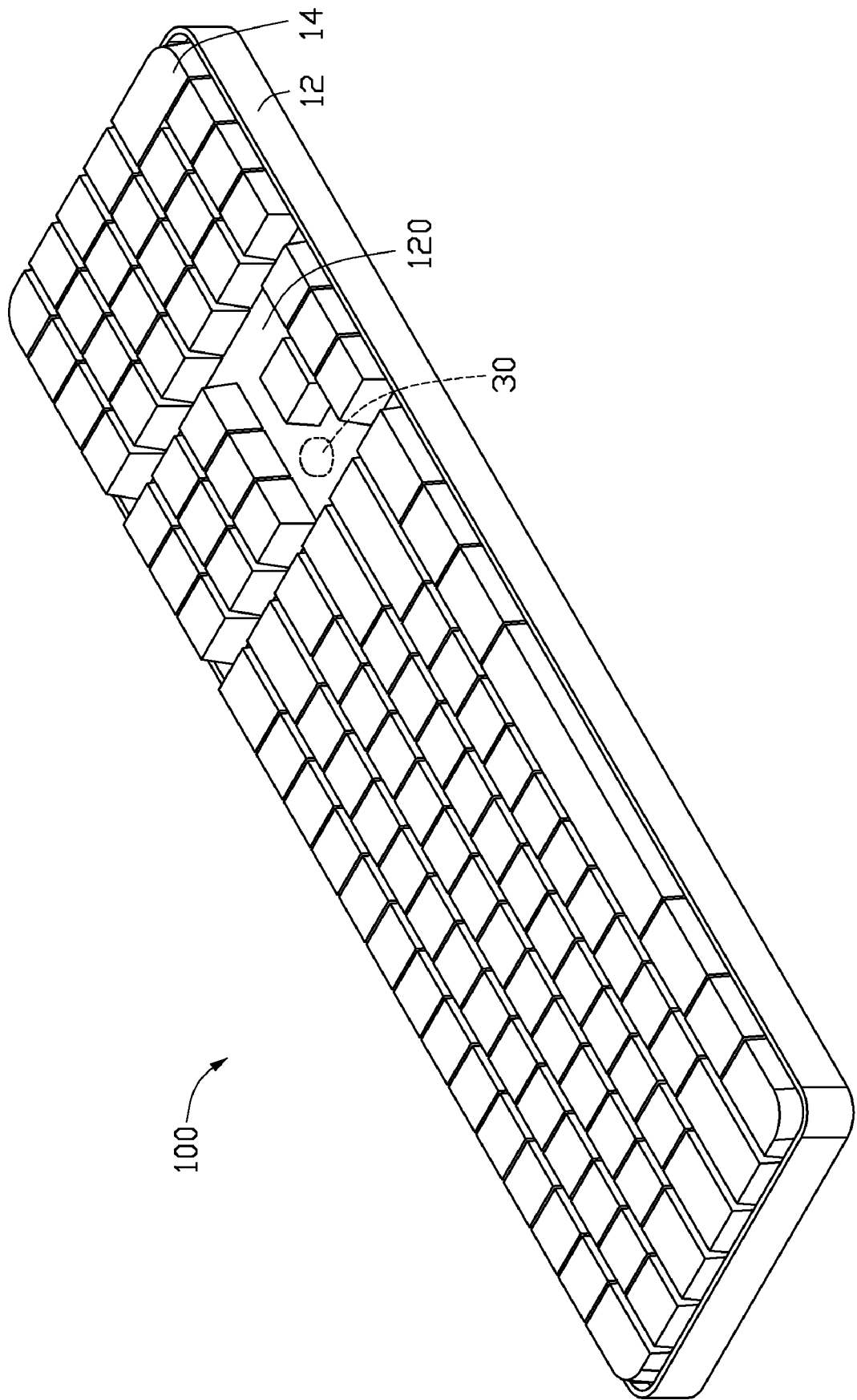
FIG. 1 is a front view of a keyboard in accordance with an exemplary embodiment.
Figure 2:
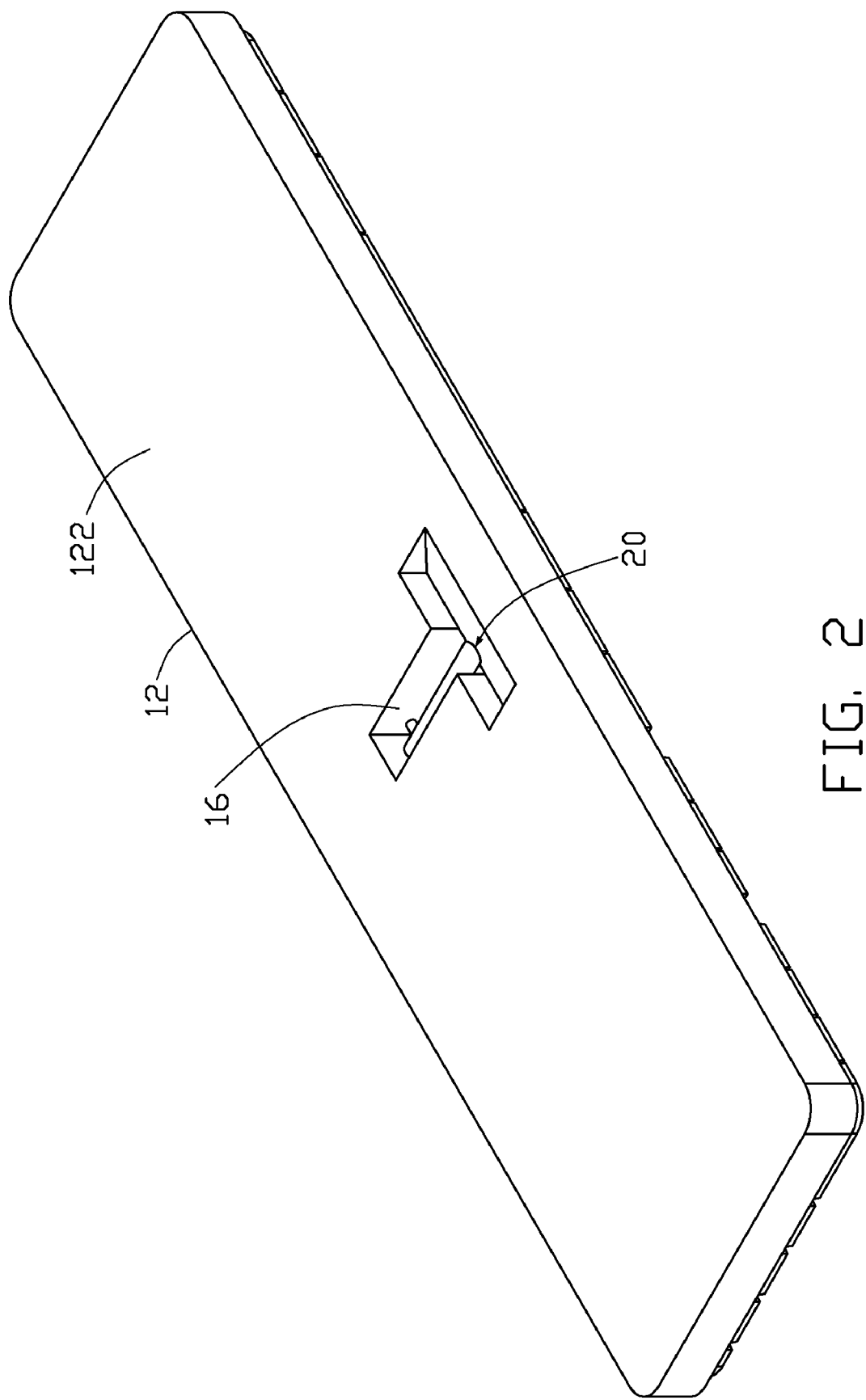
FIG. 2 is a rear view of the keyboard of FIG. 1.

Referring to FIG. 1 and FIG. 2, a keyboard 100 includes a main body 12, a swivel hinge 20 disposed on the main body 12, and a rotation detecting module 30 used for detecting the rotation of the main body 12. The swivel hinge 20 is rotatably mounted to the main body 12, and has a first pivot shaft 220 (see FIG. 3) and a second pivot shaft 250 (see FIG. 4). More specifically, the swivel hinge 20 is rotatable with respect to the main body 12 around the first pivot shaft 220 between a first position and a second position. In the first position, the swivel hinge 20 is received in a receiving slot 16 defined in the main body 12. In the second position, the swivel hinge 20 extends out from and supports the main body 12 (see FIG. 5), and the main body 12 together with the swivel hinge 20 is rotatable freely around the second pivot shaft 250.

The keyboard 100 may be operated to change between a normal mode and a game mode. In the normal mode, the main body 12 is disposed on a substantially flat surface, such as a tabletop, such that the keyboard 100 is operated to receive keystroke input. In the game mode, the main body 12 is supported via the swivel hinge 20 on the table, such that the main body 12 is operable to rotate in multiple directions. The rotation detecting module 30 detects and converts rotational inputs in the multiple directions to rotational control signals, so as to play a game according to the rotational control signals.

The main body 12 is disposed with a plurality of input keys 14 on a top surface 120 to receive the keystroke inputs. The receiving slot 16 is defined in a bottom surface 122 of the main body 12.

Figure 3:
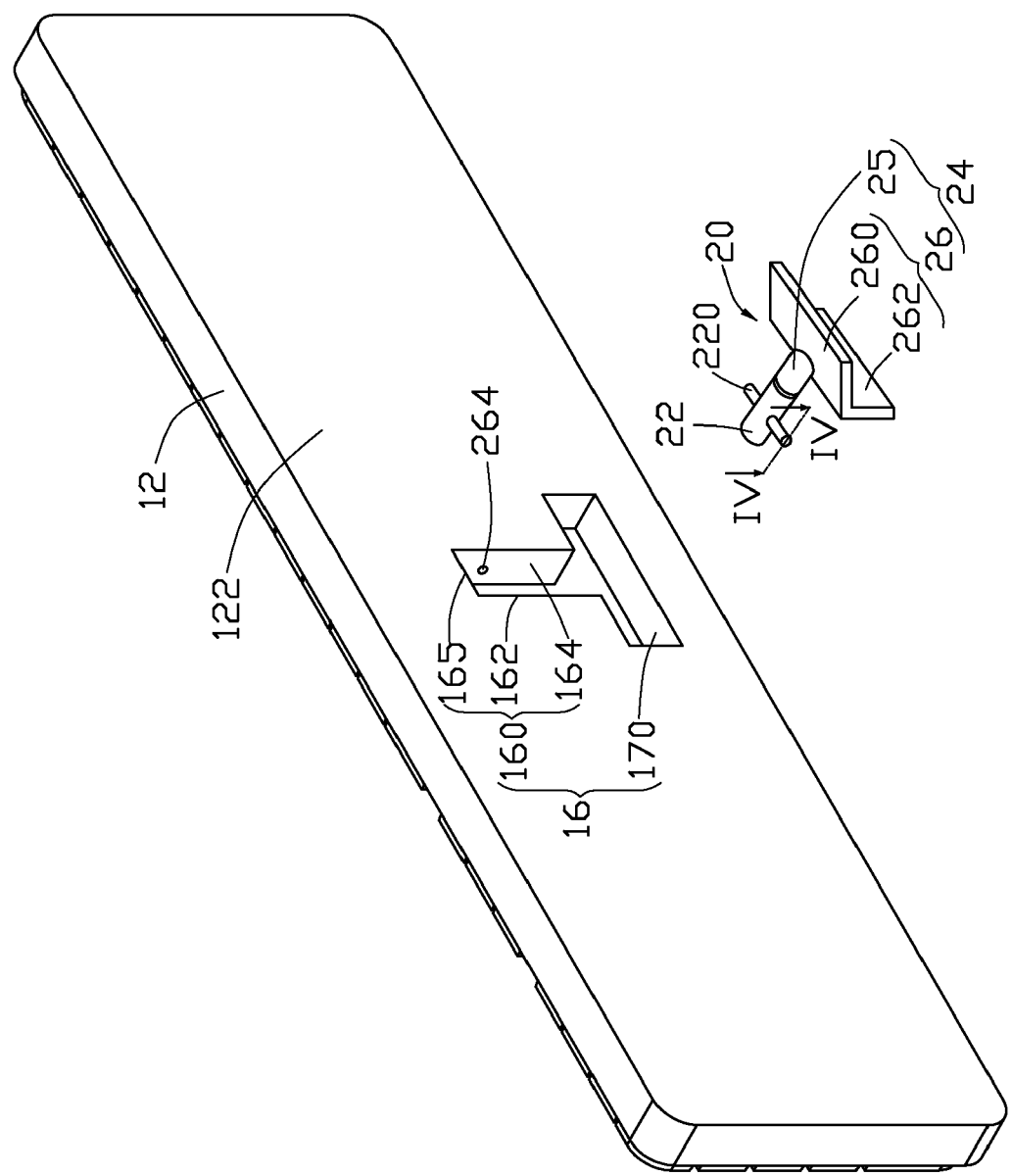
FIG. 3 is an exploded view of the keyboard of FIG. 2, the keyboard includes a swivel hinge.

Referring to FIG. 3, the receiving slot 16 is T-shaped. The receiving slot 16 is formed by a first recess 160 and a second recess 170 communicating with each other. The first recess 160 forms the base of the T-shaped receiving slot 16, the second recess 170 forms the head of the T-shaped receiving slot 16. The first recess 160 forms a first sidewall 162, a second sidewall 164 arranged in parallel with the first sidewall 162, and a third sidewall 165. The first sidewall 162 and the second sidewall 164 are connected to opposite ends of the third sidewall 165 correspondingly. Each of the first sidewall 162 and the second sidewall 164 defines a pivot hole 264.

The swivel hinge 20 includes an extending arm 22 and a supporting member 24. One end of the extending arm 22 is rotatably connected in the first recess 160, the other end of the extending arm 22 is rotatably connected to the supporting member 24.

The extending arm 22 includes a cylindrical body and a first pivot shaft 220 protruding from the cylindrical body. The first pivot shaft 220 is rotatably connected to the main body 12. One end of the first pivot shaft 220 is rotatably received in the pivot hole 264 of the first sidewall 162, and the other end of the first pivot shaft 220 is rotatably received in the pivot hole 264 of the second sidewall 164. Thus, the supporting member 24 is rotatable in and out of the main body 12.

Figure 4:
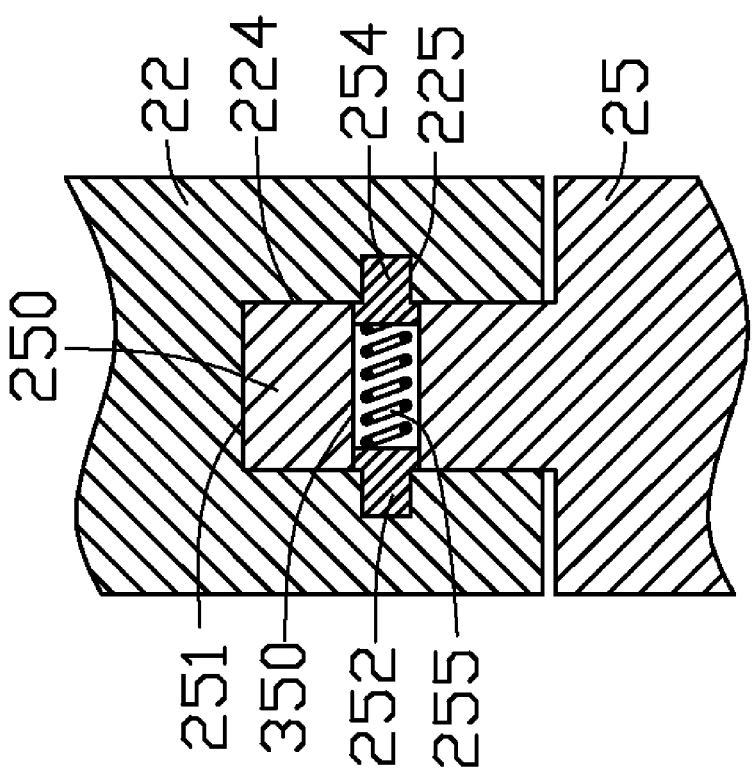
FIG. 4 is a partial profile of the swivel hinge of FIG. 3 along an IV-IV direction.

Referring also to FIG. 4, the extending arm 22 further defines a cylindrical blind hole 224 for engaging with the supporting member 24. The sidewall of the blind hole 224 defines a guiding groove 225, and the guiding groove 225 is circular. The supporting member 24 includes an extending member 25 and a supporting brace 26. One end of the extending member 25 is rotatably coupled to the extending arm 22, the other end of the extending member 25 extends from the supporting brace 26. The extending arm 22 and the extending member 25 are arranged in the same axis, and are selectively received in the first recess 160. The supporting brace 26 is received in the second recess 170 when the extending arm 22 and the extending member 25 are received in the first recess 160.

The extending member 25 includes a second pivot shaft 250, the second pivot shaft 250 is cylindrical and extends away from the supporting brace 26. The second pivot shaft 250 includes a main part 251, a first sliding member 252, a second sliding member 254, and an elastic element 255. The main part 251 defines a through hole 350. The first sliding member 252, the second sliding member 254 and the elastic element 255 are mounted in the through hole 350 with the elastic element 255 resiliently sandwiched between the first sliding member 252 and the second sliding member 254.

The first sliding member 252 and a second sliding member 254 are slidable in the sliding slot 225. Each of the first sliding member 252 and the second sliding member 254 has a wide end and a narrow end. The wide end of the first sliding member 252 and the second sliding member 254 are received in the through hole 350, and the narrow end of the first sliding member 252 and the second sliding member 254 are received in the sliding slot 225. In this embodiment, the elastic element 255 is a spring.

The extending member 25 is rotatably engaged with the extending arm 22 by the following steps: Firstly, pushing the first sliding member 252 and the second sliding member 254 until the first sliding member 252 and the second sliding member 254 are substantially received in the through hole 350, thereby compressing the elastic element 255. Secondly, inserting the second pivot shaft 250 into the blind hole 224 until the elastic element 255 pushes the first sliding member 252 and the second sliding member 254 partially out of the through hole 350 and into the sliding slot 225.

The supporting brace 26 includes a first supporting portion 260 and a second supporting portion 262 connected to the first supporting portion 260 at a certain angle. The first supporting portion 260 and the second supporting portion 262 are rectangular. The first supporting portion 260 and the second supporting portion 262 are fixed to an end of the extending member 25 at the same angle. In this embodiment, the first supporting portion 260 is perpendicularly connected to the second supporting portion 262.

The keyboard 100 may be electrically coupled to a video game device (not shown), such as a computer. The rotation detecting module 30 is disposed in the main body 12. The rotation detecting module 30 is used for detecting the rotation of the main body 12, and generating corresponding control signals and sending the control signals to the game apparatus, so as to control the game apparatus to play games.

Figure 5:
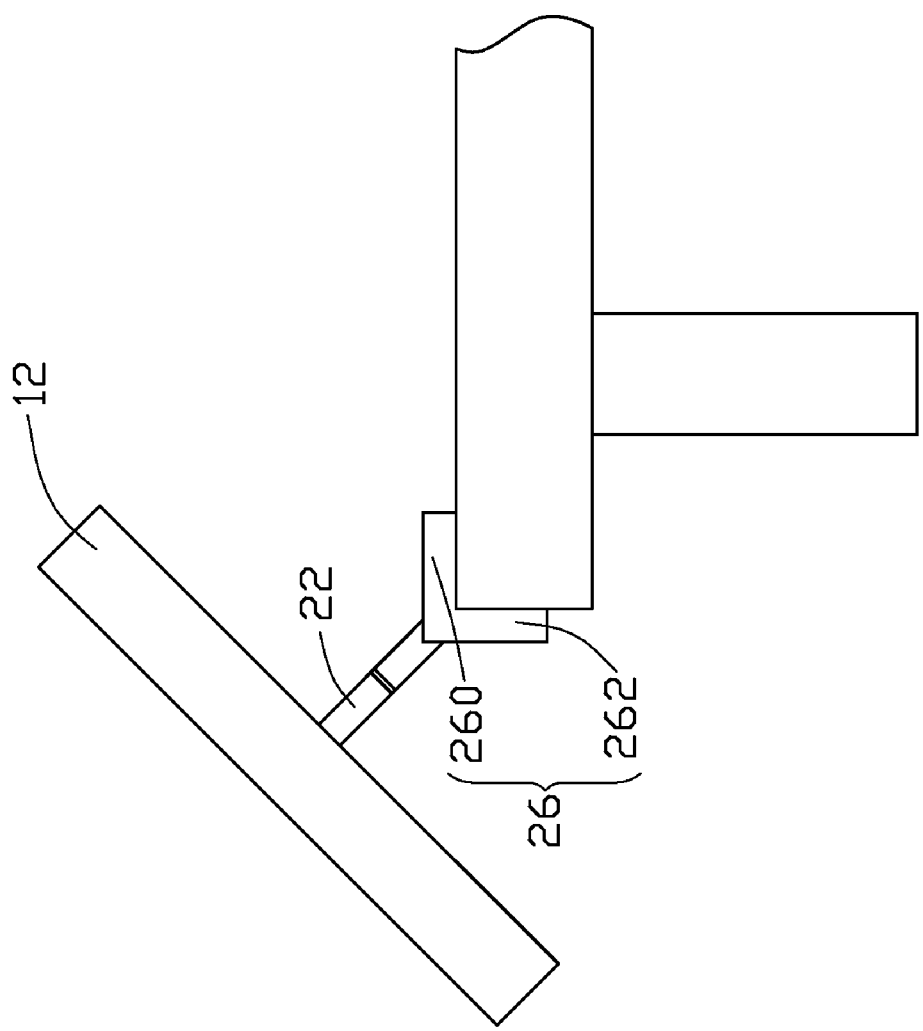
FIG. 5 is a side view of the keyboard of FIG. 1 when in use.

Referring to FIG. 5, the keyboard 100 can control the game apparatus to play games, such as racing video-games in the following ways: Firstly, pulling the swivel hinge 20 out of the receiving slot 16, and the swivel hinge 20 supports the main body 12. Secondly, supportively positioning/placing the first supporting portion 260 and the second supporting portion 262 at an edge of a table. Finally, steering/rotating the main body 12 left or right with respect to the swivel hinge 20, the rotation detecting module 30 can generate clockwise input signals or counterclockwise input signals to the game apparatus, therefore the game apparatus can control the game role of the racing games to turn left and right respectively according to the clockwise input signals and the counterclockwise input signals.

When the swivel hinge 20 is not needed for supporting the main body 12, the swivel hinge 20 can rotate with respect to the main body 12 and is received in the receiving slot 16. Therefore, the keyboard 100 can be placed in the table, and the backside of the main body 12 is even with the table.

Alternative embodiments will become apparent to those skilled in the art to which the present invention pertains without departing from the spirit and scope. Accordingly, the present invention should be deemed not to be limited to the above detailed description, but rather by the claims that follow.

What is claimed is:

1. A keyboard, comprising:
a main body disposed with a plurality of keys;
a rotation detecting module used for detecting a rotation of the main body, generating corresponding control signal according to the rotation of the main body, and sending the control signal to a game apparatus, wherein the control signal is used for controlling the game apparatus to play games; and
a swivel hinge rotatably connected to the main body, the swivel hinge comprising:
an extending arm being rotatable with respect to the main body; and
a supporting member pivotally engaging with the extending arm for supporting the main body;
wherein the main body defines a receiving slot for receiving the swivel hinge, the receiving slot comprises a first recess and a second recess communicating with each other, the supporting member comprises an extending member for being rotatably connected to the extending arm and a supporting brace for supporting the main body, the extending arm and the extending member are capable of being received in the first recess, and the supporting brace is received in the second recess when the extending arm and the extending member are received in the first recess.

2. The keyboard according to claim 1, wherein the plurality of keys are disposed on a top surface of the main body, and the receiving slot is defined in a bottom surface of the main body.

3. The keyboard according to claim 1, wherein the extending arm is provided with a first pivot shaft for being connected to the main body, the first recess comprises a first sidewall and a second sidewall, each of the first sidewall and the second sidewall respectively defines a pivot hole, one end of the first pivot shaft is rotatably received in the pivot hole of the first sidewall, the other end of the first pivot shaft is rotatably received in the pivot hole of the second sidewall.

4. The keyboard according to claim 3, wherein the extending member extends from the supporting brace.

5. The keyboard according to claim 3, wherein the second sidewall is arranged in parallel with the first sidewall, the first recess further comprises a third sidewall, the first sidewall and second sidewall are connected to opposite ends of the third sidewall.

6. The keyboard according to claim 3, wherein the extending member comprises a second pivot shaft, the second pivot shaft extends away from the supporting brace, the extending arm defines a blind hole for receiving the second pivot shaft, the second pivot shaft comprises a main part, a first sliding member, a second sliding member, and an elastic element, the main part defines a through hole, the first sliding member, the second sliding member and the elastic element are mounted in the through hole with the elastic element resiliently sandwiched between the first sliding member and the second sliding member, the sidewall of the blind hole defines a sliding slot, each of the first sliding member and the second sliding member has a wide end and a narrow end, the wide end of the first sliding member and the second sliding member is received in the through hole, the narrow end of the first sliding member and the second sliding member is received in the sliding slot.

7. The keyboard according to claim 4, wherein the supporting brace comprises a first supporting portion and a second supporting portion connected to the first supporting portion by a certain angle, the first supporting portion and the second supporting portion are connected to an end of the extending member, and are used for supporting the main body.

8. A keyboard capable of being configured in a normal mode for receiving keystroke inputs and a game mode for playing a game, the keyboard comprising:
a main body disposed with a plurality of keys, the main body defining a receiving slot;
a rotation detecting module embodied in the main body, the rotation detecting module used for detecting a rotation of the main body; and
a swivel hinge detachably mounted to the main body, wherein the swivel hinge is rotatable with respect to the main body for being in a first position at which the swivel hinge is received in the receiving slot and in a second position at which the swivel hinge extends from and supports the main body on an object;
wherein when the keyboard is configured in the normal mode, the main body is disposed on a substantially flat surface, such that the keyboard is operated to receive keystroke input; and
wherein when the keyboard is configured in the game mode, the main body is supported on the object by the swivel hinge, such that the main body is operated to rotate in multiple directions, and the rotation detecting module detects and converts rotational inputs in the multiple direction to control signals, so as to play the game according to the control signals.

9. The keyboard according to claim 8, wherein the swivel hinge comprises an extending arm being rotatable with respect to the main body and a supporting member pivotally engaging with the extending arm.

10. The keyboard according to claim 9, wherein the receiving slot comprises a first recess and a second recess, the supporting member comprises an extending member for being rotatably connected to the extending arm and a supporting brace for supporting the main body, the extending arm and the extending member are capable of being received in the first recess, and the supporting brace is received in the second recess when the extending arm and the extending member are received in the first recess.

11. The keyboard according to claim 10, wherein the plurality of keys are disposed on a top surface of the main body, and the receiving slot is defined in a bottom surface of the main body.

12. The keyboard according to claim 10, wherein the extending arm includes a first pivot shaft for being connected to the main body, the first recess comprises a first sidewall and a second sidewall, each of the first sidewall and the second sidewall defines a pivot hole, one end of the first pivot shaft is rotatably received in the pivot hole of the first sidewall, the other end of the first pivot shaft is rotatably received in the pivot hole of the second sidewall.

13. The keyboard according to claim 12, wherein the supporting member comprises an extending member and a supporting brace, one end of the extending member is rotatably coupled to the extending arm, the other end of the extending member extends from the supporting brace.

14. The keyboard according to claim 12, wherein the second sidewall is arranged in parallel with the first sidewall, the first recess further comprises a third sidewall, the first sidewall and second sidewall are connected to opposite ends of the third sidewall.

15. The keyboard according to claim 12, wherein the extending member comprises a second pivot shaft, the second pivot shaft extends away from the supporting brace, the extending arm defines a blind hole for receiving the second pivot shaft, the second pivot shaft comprises a main part, a first sliding member, a second sliding member, and an elastic element, the main part defines a through hole, the first sliding member, the second sliding member and the elastic element are mounted in the through hole with the elastic element resiliently sandwiched between the first sliding member and the second sliding member, the sidewall of the blind hole defines a sliding slot, the first sliding member and the second sliding member are slideable in the sliding slot.

16. The keyboard according to claim 15, wherein each of the first sliding member and the second sliding member has a wide end and a narrow end, the wide end of the first sliding member and the second sliding member is received in the through hole, the narrow end of the first sliding member and the second sliding member is received in the sliding slot.

17. The keyboard according to claim 13, wherein the supporting brace comprises a first supporting portion and a second supporting portion connected to the first supporting portion by a certain angle, the first supporting portion and the second supporting portion are respectively connected to an end of the extending member, and are used for supporting the main body.

\* \* \* \* \*